United States Patent
Maher et al.

(10) Patent No.: US 9,032,519 B1
(45) Date of Patent: May 12, 2015

(54) PROTECTING WEBSITES FROM CROSS-SITE SCRIPTING

(71) Applicant: Amazon Technologies, Inc., Reno, NV (US)

(72) Inventors: Brian Evan Maher, Issaquah, WA (US); Sachin Purushottam Joglekar, Bothell, WA (US); Jesper Mikael Johansson, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 72 days.

(21) Appl. No.: 13/663,256

(22) Filed: Oct. 29, 2012

(51) Int. Cl.
*G06F 11/00* (2006.01)
*H04L 29/06* (2006.01)
*G06F 21/55* (2013.01)

(52) U.S. Cl.
CPC ............... *H04L 63/08* (2013.01); *G06F 21/55* (2013.01); *H04L 29/06* (2013.01)

(58) Field of Classification Search
CPC ......... G06F 21/00; G06F 11/00; G06F 21/51; G06F 21/55; H04L 63/08; H04L 63/168; H04L 29/08; H04L 29/06
USPC ........ 726/2–3, 22–26; 709/223–226; 713/194
See application file for complete search history.

(56) References Cited

U.S. PATENT DOCUMENTS

| | | | |
|---|---|---|---|
| 7,359,976 B2 | 4/2008 | Ross et al. | |
| 8,112,799 B1 | 2/2012 | Loiodice et al. | |
| 2012/0090026 A1* | 4/2012 | Andrews et al. | ................. 726/22 |
| 2013/0090026 A1* | 4/2013 | Orselli | ............................. 440/53 |

OTHER PUBLICATIONS

"Protecting Web Applications from Universal PDF XSS," Ivan Ristic, 2007 OWASP Europe AppSec, May 2007. Source: http://www.owasp.org/images/c/c2/OWASPAppSec2007Milan_ProtectingWebAppsfromUniversalPDFXSS.ppt, , pp. 1-38.
"Prevent a cross-site scripting attack," Anand Sharma, IBM.com, Feb. 2004, Source: http://www.ibm.com/developerworks/ibm/library/wa-secxss/, pp. 1-6.
"DOM Based Cross Site Scripting or XSS of the Third Kind," Amit Klein, Web Application Security Consortium, Jul. 2005, Source: http://www.webappsec.org/projects/articles/071105.shtml, pp. 1-9.

* cited by examiner

*Primary Examiner* — Dant Shaifer Harriman
*Assistant Examiner* — Abiy Getachew
(74) *Attorney, Agent, or Firm* — Robert C. Kowert; Meyertons, Hood, Kivlin, Kowert & Goetzel, P.C.

(57) ABSTRACT

Methods and systems for protecting websites from cross-site scripting are disclosed. A request for a web page comprising a web page element is received from a client. It is determined if the web page comprises a data integrity token for the web page element. It is also determined if a value of the data integrity token matches an expected value. If the web page comprises the data integrity token and if the value matches the expected value, the web page comprising the web page element is sent to the client. If the web page does not comprise the data integrity token or if the value does not match the expected value, a protective operation is performed.

25 Claims, 8 Drawing Sheets

PROTECTING WEBSITES FROM CROSS-SITE SCRIPTING

BACKGROUND

Website operators such as online merchants are engaged in an ongoing battle to maintain information security. The complexity of the internet's infrastructure is accompanied by numerous security vulnerabilities. One such vulnerability is known as cross-site scripting. A cross-site scripting exploit may be used by an attacker to breach the security of a web browser or other web-based application. By breaching a browser's security, the attacker may gain access to a user's session at a particular website. For a user engaged in a session at the website of an online merchant, for example, a cross-site scripting exploit may permit an attacker to gain access to private information associated with the user's session, such as financial information, authentication credentials, and/or elements of the user's personal identity (e.g., a real name, an e-mail address, etc.).

In particular, a cross-site scripting flaw may be exploited to enable an attacker to inject a client-side script into a web page. The client-side script may be injected into a web page sent by a server to the client without the knowledge or consent of the server's operators. When processed in the client's browser, the script may access private information stored in one or more cookies (or other storage elements) in the memory of the browser. The script may forward the stolen information to a third-party recipient for potential use in fraudulent or otherwise malicious schemes.

Cross-site scripting exploits are often placed into two categories: non-persistent and persistent. In a non-persistent or reflected exploit, data provided to a server by a client (e.g., the client's browser) may be included in a web page sent back to the client without properly sanitizing the data. The data introducing the exploit is typically provided to the client through a link to the server provided by a third party. The link may contain an injected script or any other content that is interpretable as code by the browser. When the improperly sanitized data is sent (i.e., reflected) from the server back to the client, the injected script may be executed on the client's browser. In a persistent or stored exploit, data introducing the exploit is stored by the web server and provided by the server to each client that requests a particular web page. The data may include a script that is executed on the client side when provided by the server to the client. The script may be introduced into the server's web page through user-supplied content from a malicious third party. Whether the script is sent to the client using the non-persistent or persistent type of exploit, execution of the script on the client side may result in sensitive information being stolen and/or misused.

Accordingly, it is desirable for website operators to have techniques for detecting and/or remediating cross-site scripting exploits.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for protecting websites from cross-site scripting are described. Using the systems and methods described herein, a data integrity token having a checksum as its value may be added to particular web page elements (e.g., tags and/or attributes) when web pages are generated. Before a page is sent to a client, any web page element that lacks the data integrity token or the correct checksum may be subjected to protective or remedial action. For example, a web page element that fails the integrity check may be negated or made ineffective (e.g., by escaping it, removing it, or replacing it with a comment), or the sending of the page may be blocked. In this manner, the use of both persistent and non-persistent cross-site scripting exploits may be prevented.

Figure 1:
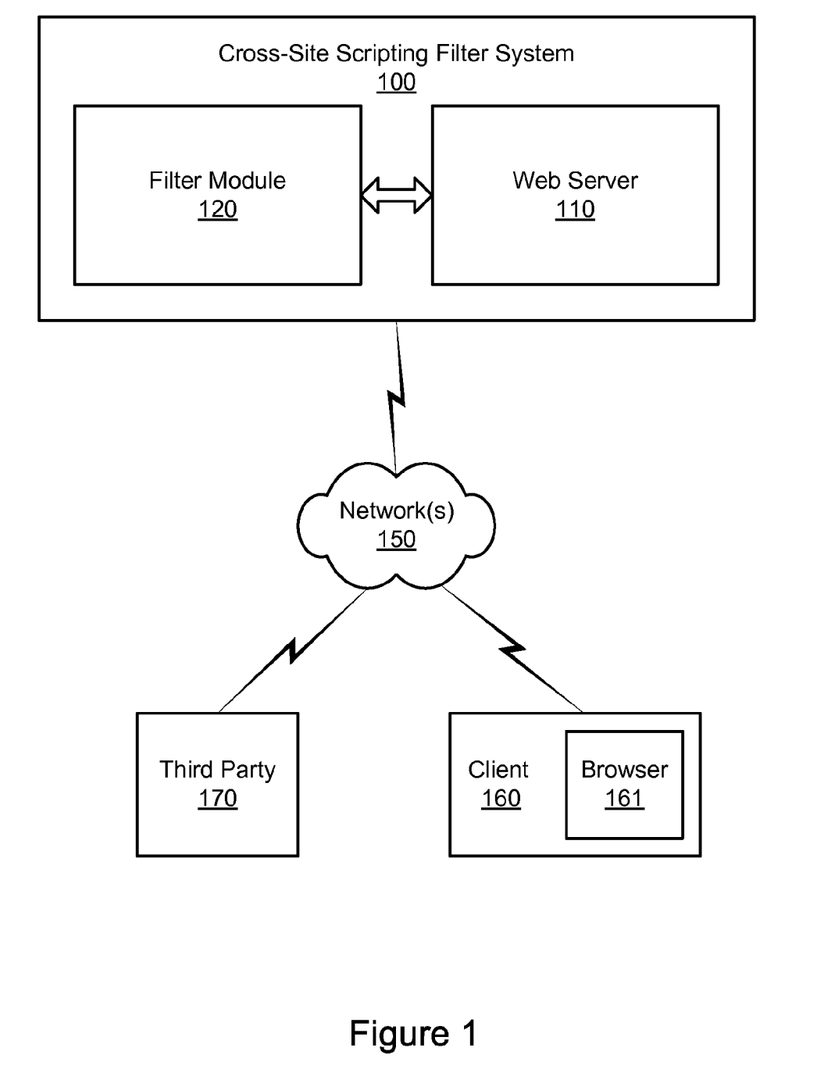
FIG. 1 illustrates an example system environment for protecting websites from cross-site scripting, according to one embodiment.

FIG. 1 illustrates an example system environment for protecting websites from cross-site scripting, according to one embodiment. The example system environment may comprise a cross-site scripting filter system 100. The cross-site scripting filter system may include various components such as a web server 110 and a filter module 120. In various embodiments, the filter module 120 may be either internal to the web server 110 or external to the web server 110. For purposes of illustration, the filter module 120 is depicted as separate from the web server 110 in FIG. 1. The cross-site scripting filter system 100 may comprise one or more computing devices, any of which may be implemented by the example computing device 3000 illustrated in FIG. 8. In various embodiments, the functionality of the different components (e.g., filter module 120 and web server 110) may be provided by the same computing device or by different computing devices. If the filter module 120 and web server 110 are implemented using different computing devices, then the computing devices may be communicatively coupled, e.g., via a network.

In one embodiment, the cross-site scripting filter system 100 and its components may be managed by an online merchant. A client computer system 160 may communicate with the cross-site scripting filter system 100 over one or more networks 150 (e.g., the internet). Using the web server 110, web pages and their components (e.g., images, video, audio, scripts, etc.) may be sent to a client browser 161 upon receiving appropriate requests from the browser. The browser 161 may comprise any suitable set of program instructions executable to receive web data and render web pages based on the web data. Web pages may be generated in accordance with a markup language such as HTML (HyperText Markup Language). In one embodiment, the web server 110 may generate elements of a web page dynamically, e.g., upon request from a client browser 161. In generating a web page, the web server 110 may retrieve elements of web pages from storage. The web server 110 may host one or more web servers under a domain such as "amazon.com." Individual ones of the web servers may be hosted at related addresses within the same domain, e.g., "server-1.amazon.com" and "server-2.amazon.com." In one embodiment, different ones of the web servers may be tasked with providing different types of data to client browsers. For example, one set of web servers may provide textual elements of web pages, and another set of web servers may provide images referenced in the web pages.

A third-party computer system 170 (also referred to herein as a third party 170) may be coupled to the client 160 and/or web server 110 over the network(s). The third-party computer system 170 may be managed by a third party that seeks to use a cross-site scripting exploit to gain illegitimate access to private information associated with the client computer system 160 and/or browser 161. The private information may comprise financial information, authentication credentials, elements of the user's personal identity (e.g., a real name, an e-mail address, etc.), and/or any other information stored using the client computer system 160 and/or browser 161 that is not intended to be available to the third party 170. Additionally, the third-party computer system 170 may exploit a cross-site scripting flaw to collect anonymous usage statistics. The third-party computer system 170 may comprise a web server, an e-mail server, a web client, or any other suitable computer system for exploiting a cross-site scripting flaw to access the client's information.

Using the filter module 120, a script or any other set of instructions provided by the third party 170 may be subjected to protective or remedial action before a requested web page is sent from the web server 110 to the client computer system 160. As used herein, the term "script" may refer to a script tag or any reference invoking a set of instructions. In one embodiment, a third-party script may be escaped in a web page by encoding the script (e.g., using an HTML comment) so that it will not be automatically executed in the browser 161. In one embodiment, a third-party script may be removed from a web page sent from the web server 110 to the client 160. In one embodiment, a requested page containing a third-party script may not be sent to the client 160. In one embodiment, an alternative page or a redirect link may be sent to the client 160 instead of the requested page if the requested page includes a third-party script. The use of the cross-site scripting filter system 100 to protect websites from cross-site scripting is discussed in greater detail below.

Figure 2:
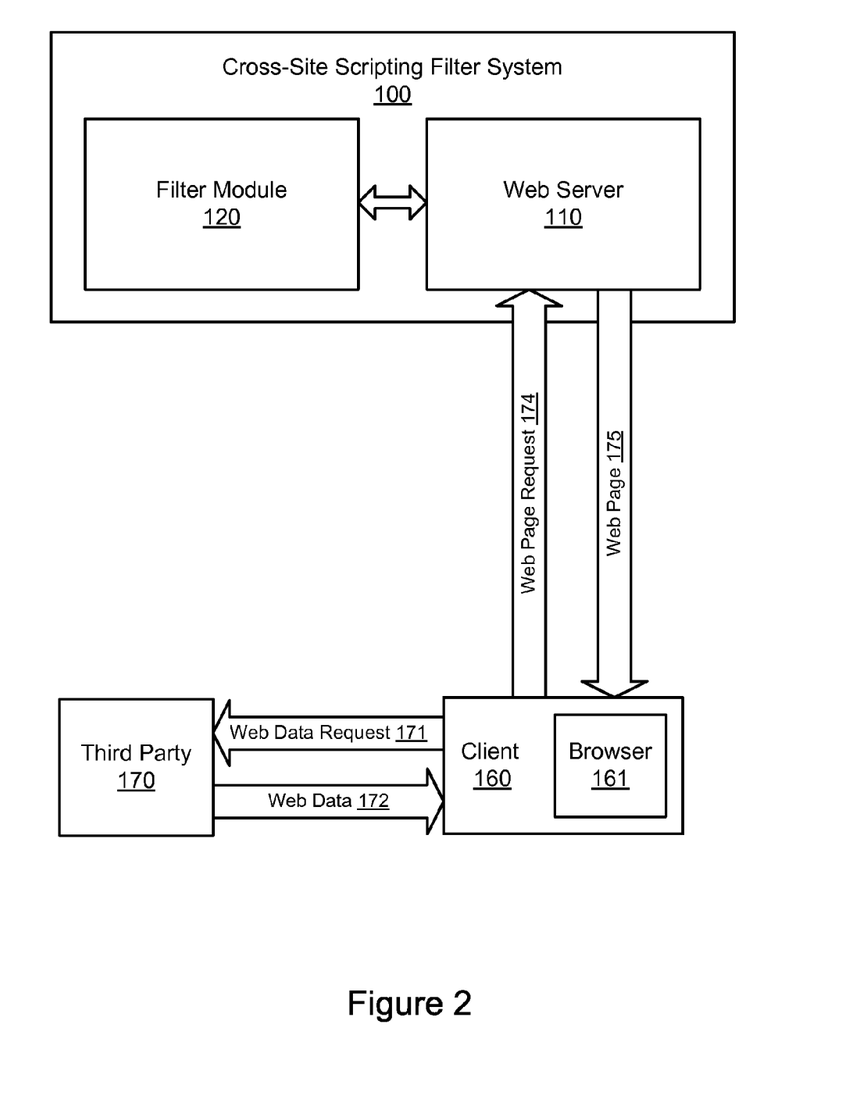
FIG. 2 illustrates an example system environment for protecting websites from non-persistent cross-site scripting, according to one embodiment.

FIG. 2 illustrates an example system environment for protecting websites from non-persistent cross-site scripting, according to one embodiment. In one embodiment, the third-party computer system 170 may comprise a web server that is managed by a third-party entity. Upon receiving a web data request 171 from the client 160, the third-party computer system may send web data 172 comprising a web page to the client 160. The web page may include a link to the web server 110, and the link may comprise an injected script. If the browser 161 follows the link and sends a corresponding web page request 174 to the web server 110, the injected script in the link may be reflected back to the browser in a web page 175 and executed on the client 160 if the non-persistent cross-site scripting exploit is not properly remediated. In one embodiment, the third-party computer system 170 may comprise an e-mail server. In this case, web data 172 sent from the third party 170 to the client 160 may comprise an e-mail, and the e-mail may include a link to the web server 110 with an injected script. Again, if the browser 161 follows the link and sends a corresponding web page request 174 to the web server 110, the injected script in the link may be reflected back to the browser in a web page 175 and executed on the client 160 if the non-persistent cross-site scripting exploit is not properly remediated. Whether the third-party computer system 170 comprises a web server or an e-mail server, the non-persistent cross-site scripting exploit may be used to obtain illegitimate access to information associated with the client computer system 160 and/or browser 161. The malicious script may further send the private information back to the third party 170.

Figure 3:
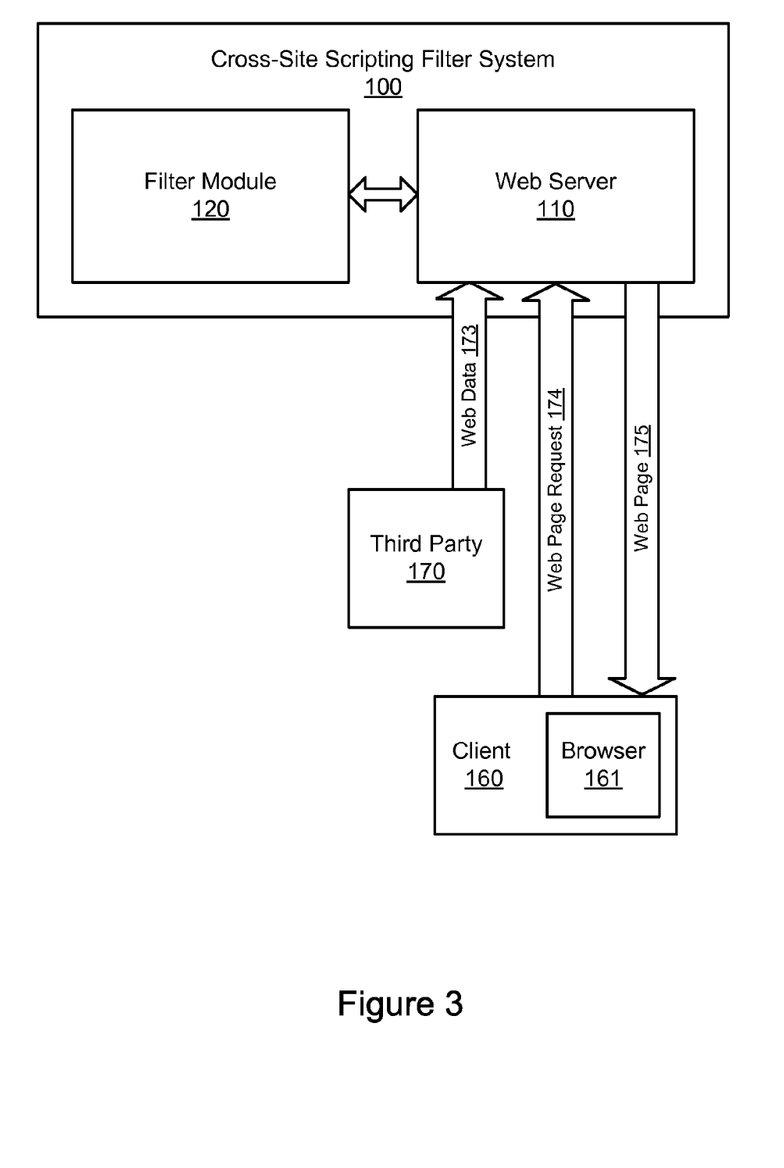
FIG. 3 illustrates an example system environment for protecting websites from persistent cross-site scripting, according to one embodiment.

FIG. 3 illustrates an example system environment for protecting websites from persistent cross-site scripting, according to one embodiment. In one embodiment, the third-party computer system 170 may comprise a web client that provides web data 173 to the web server 110. The web data 173 may be stored by the web server 110 and potentially may be provided by the web server 110 to many client browsers. For example, the web data 173 may comprise a product review or other product information supplied to a web server 110 that is managed by an online merchant, and the web data 173 may be sent to the browser 161 as an element of a product page for a product or service offered by the online merchant. The web data 173 supplied by the third party 170 may include an injected script. If the browser 161 sends a web page request 174 to the web server 110 for a web page 175 that includes the user-supplied web data 173, the injected script in the web data 173 may be sent to the browser as part of the web page 175. If this persistent cross-site scripting exploit is not properly remediated, the script may be executed on the client 160 to obtain illegitimate access to information associated with the client computer system 160 and/or browser 161. The malicious script may further send the information back to the third party 170.

Figure 4:
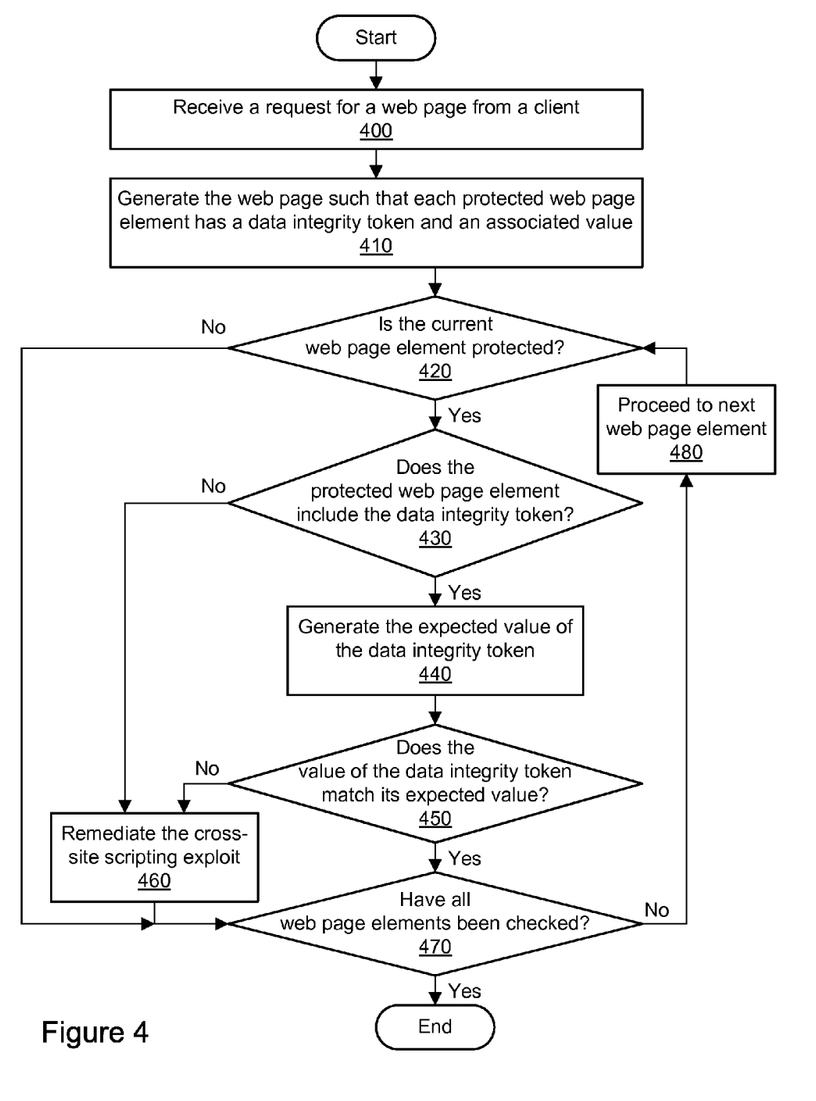
FIG. 4 is a flowchart illustrating a method for protecting websites from cross-site scripting, according to one embodiment.

FIG. 4 is a flowchart illustrating a method for protecting websites from cross-site scripting, according to one embodiment. As shown in 400, a request for a web page may be received at a web server from a client. The web page may comprise at least one web page element that may potentially contain injectable instructions such as a script. A web page element may comprise a control element such as a tag or an attribute of a tag (e.g., an event attribute), and the web page element may be coded in HTML. As shown in 410, the web page may be generated by the web server. The web page may be generated such that each protected web page element originating from the web server has a data integrity token and an associated value. Protected web page elements may be capable of containing an injected script and may be identified using a lookup table. In one embodiment, protected web page elements may be identified using a blacklist, and web page elements that are not protected may be identified using a whitelist. In one embodiment, some dynamic and/or user-supplied elements of a web page, such as a search string provided with a web page request 174, will not be instrumented with the data integrity token (or its correct value) and may thus fail an integrity check performed by a cross-site scripting filter.

The data integrity token may comprise any suitable token that is usable to verify that the associated web page element is secure from a cross-site scripting exploit. In one embodiment, the data integrity token may be a custom attribute such as "X$" or any other suitable token. The value of the data integrity token may be a hash of one or more values generated using a hash function, such that the data integrity token for each vulnerable item is indicated as "X$=[hash_value]". In one embodiment, the value of the data integrity token may be a checksum. The value of the data integrity token may be generated as a hash of one or more values such as a request identifier (request ID) for the requested web page, the injectable content of the web page element, and/or any other suitable values (e.g., a secure key). A request ID may be generated internally by the web server for each requested web page in a manner that is difficult for an outside entity to predict, such as by using a random or pseudo-random number generator.

In one embodiment, the value of the data integrity token may be calculated as a checksum based on the request ID and the injectable content of the web page element. The injectable content of the web page element comprises any part of a web page element (e.g., a tag, attribute, or other control element) where malicious content may be injected. In one embodiment, the value of the custom X$ attribute is calculated as follows:

tag.attributer ["X$"]=NmtokenBase64(Concatenate (CRC24(RID), CRC24(canonize(tag))))

If the tag contains content (e.g., a <script> tag), then that content may also be included in the output of the canonize (tag) function. In one embodiment, the canonize(tag) function supplies the following text into the CRC24 function: the tag name; a null byte; all tag attributes (except the special X$ attribute) in alphanumeric order, where each tag attribute is represented as an attribute name, an equals sign, an attribute value, and a null byte; and, if this is a "script" or "style" tag, the content between the start of this tag and the closing tag. In one embodiment, NmtokenBase64 is an XML Nmtoken (name token) as modified for base64.

Before the web page is sent to the client, a cross-site scripting filter may verify the presence of the data integrity token and the correctness of its value for each protected web page element in the web page. The filter may iterate through every web page element (e.g., tag, attribute, or other control element), beginning with a first web page element. As shown in 420, the filter may determine if the web page element in the current iteration is protected. As discussed above, the protected status of each web page element may be determined using a lookup table. If the web page element in the current iteration is not protected, the method may proceed to 470 to determine whether all the web page elements have been checked. If there are web page elements not yet checked by the filter, then the method may proceed to the next web page element, as shown in 480. When all the web page elements have been checked, the method may end.

If the web page element in the current iteration is protected, then the filter may determine if the web page element includes the data integrity token, as shown in 430. If the protected web page element does include the data integrity token, then the filter may generate the expected value of the data integrity token, as shown in 440. In one embodiment, the expected value of the data integrity token may be generated using the same technique or function (e.g., hash function) and using the same input (e.g., the request ID for the page, the injectable content, etc.) as used in 410. As shown in 450, the filter may determine if the value (e.g., a hash or checksum) for the data integrity token matches the expected value. If the values match, then the protected web page element passes the integrity check, and the method may proceed to 470 to determine whether all the web page elements in the web page have been checked. If there are web page elements not yet checked by the filter, then the method may proceed to the next web page element, as shown in 480.

If a protected web page element does not have the data integrity token or if the value of the token does not match the expected value, then the integrity check fails, and the web page may be considered to include a cross-site scripting exploit. Accordingly, as shown in 460, the cross-site scripting exploit may be remediated. In various embodiments, the remediation operation may use various techniques to protect the client browser from the cross-site scripting exploit. In one embodiment, remediation comprises modifying the web page to negate an effect of the web page element or otherwise to render the web page element ineffective. In one embodiment, a remediated script may be escaped in the modified web page by encoding the script (e.g., as an HTML comment) so that it will not be automatically executed in the browser 161. In one embodiment, the remediated script may be removed from the web page element in the modified web page. In one embodiment, remediation comprises replacing the script with a comment (e.g., an HTML comment) that includes an identifier of an entry in a log file, where the entry in the log file provides details of the attempt to use the cross-site scripting exploit. If the web page is sent to the client, then when the page is rendered in the client's browser, the script introduced using the cross-site scripting exploit will not be run due to the remediation operation performed in 460. In one embodiment, remediation comprises blocking the access of the client to the web page (e.g., by not sending the web page). In one embodiment, remediation comprises sending an alternative web page or a redirect link to the client instead of the requested web page. The alternative web page or the page at the redirect link may inform a user of the client browser of the attempted use of the cross-site scripting exploit.

The method may end after all the protected web page elements in the web page have been checked. If none of the protected web page elements failed the integrity check, then the original web page may be sent to the client and safely rendered in the client browser. In one embodiment, a modified version of the original web page may be sent to the client after all the protected web page elements have been checked, where the modified web page includes one or more remediated cross-site scripting exploits. The modified web page may also be safely rendered in the client browser.

Figure 5:
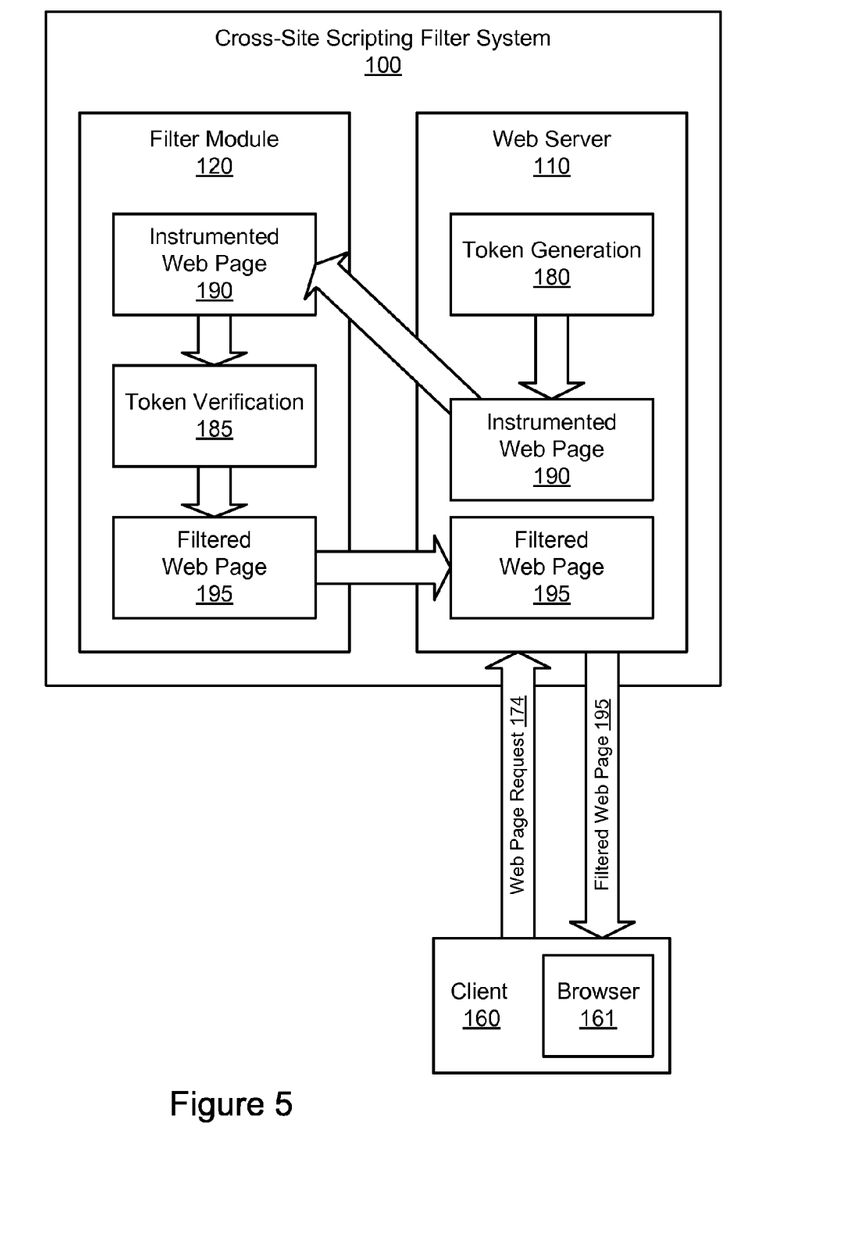
FIG. 5 illustrates further aspects of an example system environment for protecting websites from cross-site scripting, according to one embodiment.

FIG. 5 illustrates further aspects of an example system environment for protecting websites from cross-site scripting, according to one embodiment. In various embodiments, the filter module 120 may be either internal to the web server 110 or external to the web server 110. For purposes of illustration, the filter module 120 is depicted as separate from the web server 110 in FIG. 5. A token generation functionality 180 may instrument one or more web pages (or their constituent components) with a data integrity token for each protected web page element. In various embodiments, the tokens may be generated before or after a web page request 174 is received from the browser 161 of a client 160. The web server 110 may also use the data integrity token generation functionality 180 to generate a value (e.g., a checksum based on the request ID, the injectable content, etc.) for each data integrity token associated with a protected web page element in the requested web page. The values of the token may be generated at runtime, e.g., after the page request 174 has been received. The output of the token generation 180 may be referred to as an instrumented web page 190.

The filter module 120 may apply a data integrity token verification functionality 185 to each protected web page element in the web page. As discussed above with respect to FIG. 4, any protected web page element that lacks the data integrity token or the correct expected value of the data integrity token may be deemed to constitute a cross-site scripting exploit. In one embodiment, any cross-site scripting exploits may be filtered by performing a protective or remediative operation such that the exploits are made ineffective, e.g., by deleting them from the web page, by escaping them, by confining them to comments, or by blocking the page altogether. The result of this filtering may be referred to as a filtered web page 195. In one embodiment, the filtered web page 195 may comprise a different web page or a redirect link to warn the user of the attempted use of a cross-site scripting exploit. The web server 110 may send the filtered web page 195 to the requesting client 160 for safe rendering in the browser 161.

Figure 6:
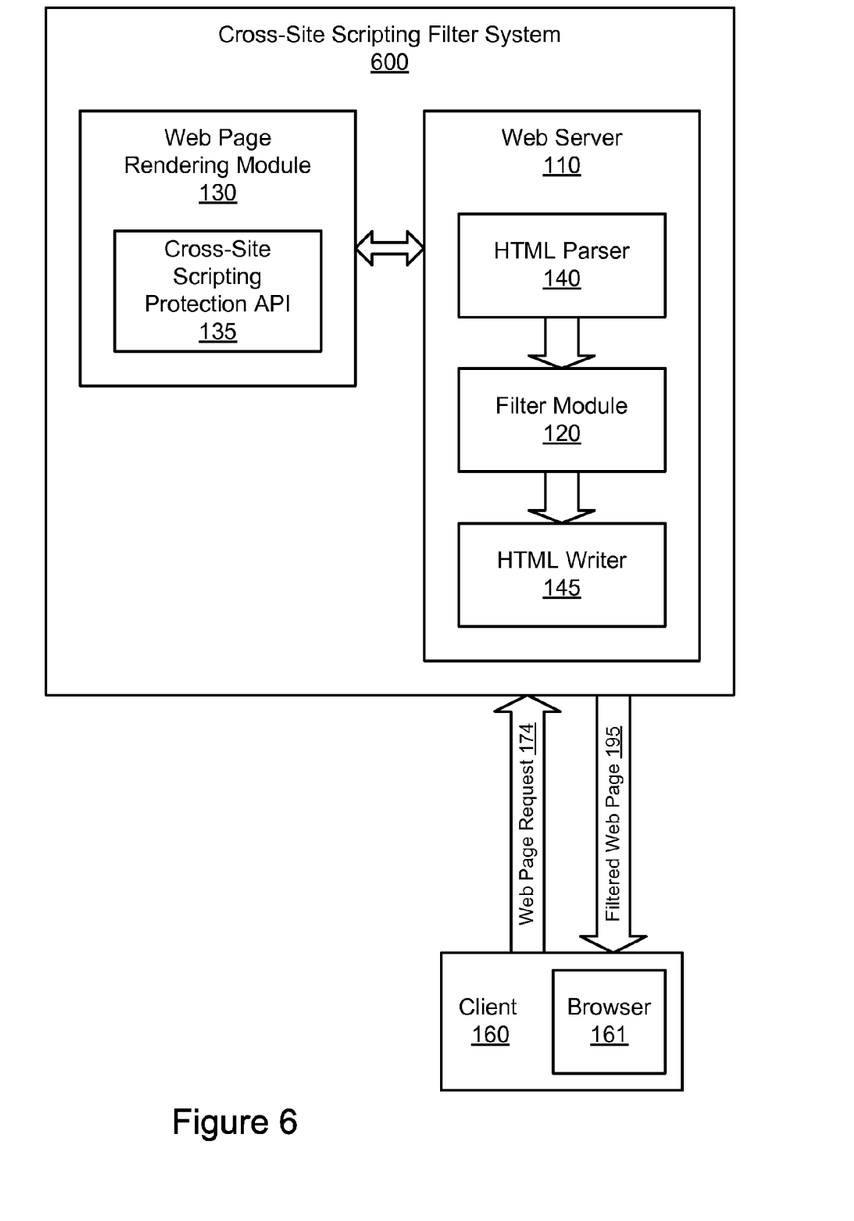
FIG. 6 illustrates an example system environment for protecting websites from cross-site scripting including a cross-site scripting protection API, according to one embodiment.

FIG. 6 illustrates an example system environment for protecting websites from cross-site scripting including a cross-site scripting protection API, according to one embodiment. In various embodiments, the filter module 120 may be either internal to the web server 110 or external to the web server 110. For purposes of illustration, the filter module 120 is depicted as part of the web server 110 in FIG. 6. The cross-site scripting filtering system 600 may also include a web page rendering module 130 that assembles web pages, e.g., based on combinations of static content and dynamic content. For example, the web page rendering module 130 may build a page based on one or more templates along with various elements of content to fill the templates. In one embodiment, the web page rendering module 130 may invoke a plurality of backend services to build a web page. The web page rendering module 130 may build a web page upon receiving a request 174 from a client 160. The web page rendering module 130 may then supply the assembled web page to the web server 110 so that the web page can be sent to the client 160. In one embodiment, the web server 110 may include an HTML parser 140 and an HTML writer 145. The HTML parser 140 may parse an HTML document provided by the web page rendering module 130 prior to application of the filter module 120, and the HTML writer may produce a web page (e.g., the filtered web page 195) that is suitable for sending to the client 160.

In one embodiment, the web page rendering module 130 may include a cross-site scripting protection API (Application Programming Interface) 135. The cross-site scripting protection API 135 may permit developers to add cross-site scripting filtering functionality to elements of web pages. For example, the cross-site scripting protection API 135 may provide a set of tools for automatically adding cross-site scripting protection instrumentation to web pages and their constituent elements, such as HTML templates or other HTML components. The cross-site scripting protection API 135 may be used to add the data integrity token (e.g., X$) to each protected web page element in an HTML document. In one embodiment, web pages and their elements may be instrumented with the data integrity token before a relevant web page is requested by a client. The addition of the data integrity tokens may be a manual process, an automated process, or a mixed manual/automated process. In one embodiment, a developer or administrator of the cross-site scripting filtering system 600 may selectively apply the cross-site scripting filtering to different combinations of web page elements (e.g., tags and attributes). In one embodiment, the value of the data integrity token may be added (e.g., based on a hash function) at runtime, after the web page request 174 is received and a corresponding request ID is generated. In one embodiment, an existing base of code for web pages may be converted for use with the cross-site scripting filter system 600 using the cross-site scripting protection API 135.

In one embodiment, the cross-site scripting protection API 135 may provide the following type definitions and functions:

```
struct script_t {
    const char* file_name;
    json_value_t* json;
};
typedef struct tag_t tag_t;
tag_t* new_tag(const char* name);
void add_attr(tag_t* tag, const char* key, const char* val);
void add_script_attr(tag_t* tag, const char* key, script_t*
    script);
void add_script_body(tag_t* tag, script_t* script);
```

The function new_tag may create an HTML tag with the specified name. The function add_attr( ) may add a non-scriptable key/value pair. To add a data integrity token to a scriptable attribute, the add_script_attr( ) API may be used instead. To generate a script tag, the body of the script may be appended to using the add_script_body( ) API. In one embodiment, the script_t type is a filename (or abstract "key") that points at a static script which is passed in the json value.

The json_value_t object may be implemented in accordance with a suitable data interchange format such as JavaScript Object Notation (JSON). In one embodiment, the json_value_t type may be defined as follows:

```
typedef enum {
    json_object,
    json_array,
    json_string,
    json_number,
    json_true,
    json_false,
    json_null,
} json_type_t;
typedef struct json_value_t_json_value_t;
typedef struct json_t {
    /* Determine the type of a JSON value: */
    json_type_t (*get_type)(const json_value_t* value);
    /* If value is an object, *key and *value to the key/value
       pair at
     * the specified idx.
     *
     *If value is an array, *key is set to NULL and *value
        is the
     *element at the specified idx.
     *
     *Otherwise *key and *value are set to NULL.
     */
    void (*get_pair)(const json_value_t* value, size_t idx,
        const json_value_t** key, const json_value_t** val);
    /* Returns the number of pairs in an object or the number
        of
     * elements in an array. All other types return zero.
     */
    size_t (*get_length)(const json_value_t* value);
    /* Returns a null terminated string representation of this
        value
``` and sets *length to the length of this string if length is not
*NULL. Array and object type always return NULL.
*/
    const char* (*get_string)(const json_value_t* value, int* length);
    /* Return the number, all other types this returns zero. */
    double (*get_number)(const json_value_t* value);
} json_t;
struct json_value_t {
    json_t* json;
};

In one embodiment, the cross-site scripting protection API 135 may also provide the following function for including the contents of a file after adding the data integrity token (e.g., the X$ attribute) to each tag inside the file:

html include(const char* filename, FILE* output)

Figure 7:
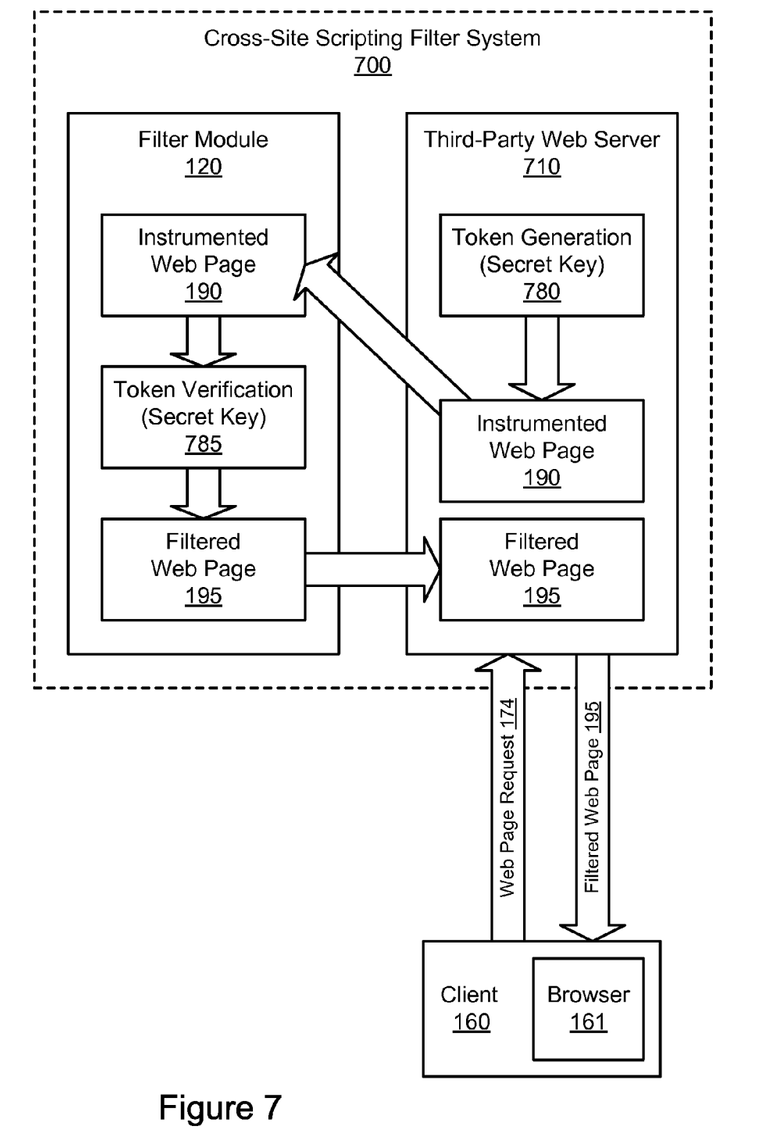
FIG. 7 illustrates an example system environment for protecting third-party websites from cross-site scripting, according to one embodiment.

FIG. 7 illustrates an example system environment for protecting third-party websites from cross-site scripting, according to one embodiment. In one embodiment, any of the cross-site scripting protection methods and systems described herein may be provided to a third-party website by an entity that maintains a filter module 120 in a cross-site scripting filter system 700. A third-party web server 710 and the filter module 120 may be maintained by different business entities using differing computing systems that are coupled over one or more networks (e.g., the internet). For example, the cross-site scripting filtering may be made available as a service to a third-party online merchant that seeks to provide web pages offering products and/or services using a third-party web server 710. The third-party web server 710 may receive a web page request 174 and, using a token generation functionality 780, generate one or more data integrity tokens for the requested web page. In one embodiment, the tokens may be generated based on a secret key (e.g., a private key) instead of a request ID. The secret key may be shared with the filter module 120 so that the filter module 120 may implement a token verification functionality 785 based on the secret key. In the manner discussed above, the filter module 120 may generate a filtered web page 195 for use by the third-party web server 710. In one embodiment, the cross-site scripting protection API 135 may be provided to the third-party web server 710 for instrumentation of web pages as protection from cross-site scripting exploits.

Examples of cross-site scripting exploits that may be filtered using a cross-site scripting filter system are discussed as follows. In a first example, a cross-site scripting exploit is contained in the following link received by the web server 110:

http://www.amazon.com/gp/search/ q=bicycle<script>alert(1); </script>

If this link were to be processed by the web server 110 and reflected back to the client 160, the vulnerable HTML output would include the following text:

Your search for bicycle<script> alert(1); </script> returned:

The exploit may be detected because the filter module 120 expects the security (e.g., X$) attribute in <script> tags. Because the <script> tag injected by the attacker does not have an X$ attribute, the filter module 120 may replace the <script> tag with the following comment, where the comment identifies an entry in a log file that provides details of the attempt at using the cross-site scripting exploit:

<!--X$ fail: x3YupQWeDf-->

In this manner, the effect of the <script> tag in the client browser may be negated.

In a second example, a cross-site scripting exploit is contained in the following code:

userID="AB34EDC983234"><script>alert(1)</script>

If this web data were to be processed by the web server 110 and sent to the client 160, the vulnerable HTML output would include the following code:

<input type="hidden" name="userID" value="AB34EDC983234"><script>alert(1)</script>">

The filter module 120 expects the security (e.g., X$) attribute to be present with a correct value in the <script> tag. In this example, however, the injected script tag does not have the data integrity token and therefore will be rejected by the filter module 120. The filtered output may include a comment that identifies an entry in a log file that provides details of the attempt at using the cross-site scripting exploit:

<input type="hidden" name="userID" value="AB34EDC983234"><!--X$ fail: FxsxZrltr-->

In this manner, the effect of the <script> tag in the client browser may be negated.

In a third example, a cross-site scripting exploit is contained in the following code:

userID="AB34EDC983234" onmouseover="javascript: alert(1);

If this web data were to be processed by the web server 110 and sent to the client 160, the vulnerable HTML output would include the following code:

<a href="AB34EDC983234" onmouseover="javascript: alert(1);">Click here </a>

In one embodiment, the a/onmouseover combination may be considered vulnerable to cross-site scripting exploits. Accordingly, the filter module 120 may look for the security (e.g., X$) attribute and its correct value before a web page containing the a/onmouseover combination is sent to the client 160. If a developer associated with the web server 110 intended to permit the onmouseover attribute to contain a script, then the cross-site scripting protection API 135 could be written to permit it. Because the onmouseover attribute in this example lacks the correct value for the data integrity token, however, the filter module 120 will reject it. The filtered output may include a comment that identifies an entry in a log file that provides details of the attempt at using the cross-site scripting exploit:

<!--X$ fail: UsIFsgw--><a>Click here</a>

Illustrative Computer System

Figure 8:
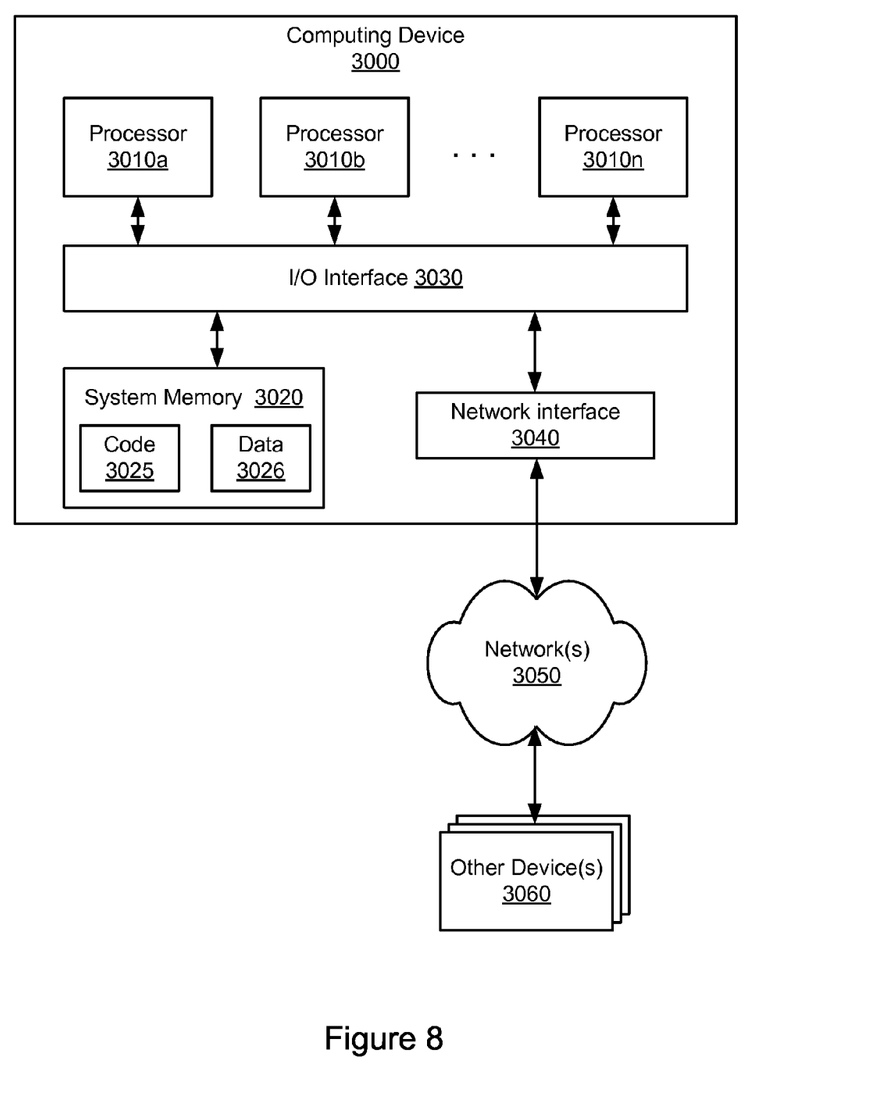
FIG. 8 illustrates an example computing device that may be used in some embodiments.

In at least some embodiments, a computer system that implements a portion or all of one or more of the technologies described herein, such as the cross-site scripting filter system 100, may include a general-purpose computer system that includes or is configured to access one or more computer-readable media. FIG. 8 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1, 2, 3, 5, and 6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computers configured to implement a cross-site scripting filter system, wherein the cross-site scripting filter system comprises:
a web server configured to:
receive a request for a web page from a client, wherein the web page comprises a particular web page element and a different web page element;
generate a request identifier for the requested web page according to a technique to obscure prediction of the request identifier by an outside entity; and
generate the web page comprising the particular web page element and the different web page element, a particular data integrity token for the particular web page element, wherein a value of the particular data integrity token is calculated, for the particular web page element, according to a particular checksum of at least the request identifier and at least a portion of the web page element; and
a filter module configured to:
determine that the particular web page element comprises the particular data integrity token and that a value of the particular data integrity token matches an expected value of the particular data integrity token;
determine that the different web page element does not comprise a different data integrity token or that a value of the different data integrity token does not match an expected value of the different data integrity token; and protect the client from an effect of the different web page element.

2. The system as recited in claim 1, wherein, in protecting the client from the effect of the different web page element the filter module is further configured to:

generate a modified web page, wherein instructions embedded with the different web page element are escaped or removed in the modified web page; and wherein the web server is further configured to:

send the modified web page to the client, wherein the modified web page comprises the particular web page element.

3. The system as recited in claim 1, wherein, in protecting the client from the effect of the different web page element the filter module is configured to:

block access to the web page.

4. The system as recited in claim 1, wherein the web server is operated by a different business entity than the filter module, wherein the web server is further configured to generate the value of the particular checksum based on a secret key, and wherein the filter module is further configured to generate the expected value of the particular checksum based on the secret key.

5. The system as recited in claim 1, wherein, in generating the web page, the web server is further configured to:

determine that the particular web page element and the different web page element are protected web page elements according to a blacklist; and determine that a different particular web page element is an unprotected web page element according to a whitelist, and wherein the filter module is configured to bypass checking whether the different particular web page element comprises a corresponding data integrity token.

6. A computer-implemented method, comprising:

receiving a request for a web page from a client, wherein the web page comprises a control element;

generate a request identifier for the requested web page according to a technique to obscure prediction of the request identifier by an outside entity;

determining if the web page comprises a data integrity token for the control element;

determining if a value for the data integrity token matches an expected value for the data integrity token, wherein the expected value for the data integrity token is calculated, for the control element, according to a checksum of at least the request identifier and at least a portion of the control element;

if the web page comprises the data integrity token and if the value for the data integrity token matches the expected value for the data integrity token, sending the web page comprising the control element to the client; and if the web page does not comprise the data integrity token or if the value for the data integrity token does not match the expected value for the data integrity token, performing a protective operation regarding the control element.

7. The method as recited in claim 6, wherein performing the protective operation regarding the control element comprises:

generating a modified web page, wherein the modified web page comprises a comment in place of executable content of the control element; and sending the modified web page to the client.

8. The method as recited in claim 6, wherein performing the protective operation regarding the control element comprises sending a redirect link to the client.

9. The method as recited in claim 6, wherein performing the protective operation regarding the control element comprises blocking access to the web page comprising the control element.

10. The method as recited in claim 6, further comprising:

generating the expected value for the data integrity token based on injectable content of the control element.

11. The method as recited in claim 6, further comprising:

adding the data integrity token to the web page prior to receiving the request for the web page from the client; and generating the value for the data integrity token after receiving the request for the web page from the client.

12. The method as recited in claim 6, wherein the web page comprises a different control element, wherein the different control element is an unprotected control element according to a whitelist, wherein no determination is made regarding whether the web page comprises a corresponding data integrity token for the different control element.

13. A system, comprising:

at least one processor; and a memory coupled to the at least one processor, wherein the memory stores program instructions, wherein the program instructions are executable by the at least one processor to:

receive a request for a web page from a client, wherein the web page comprises a web page element;

generate a request identifier for the requested web page according to a technique to obscure prediction of the request identifier by an outside entity;

determine if the web page element comprises a custom attribute;

determine if a verification value for the custom attribute matches an expected verification value for the custom attribute, wherein the expected verification value is calculated, for the custom attribute, according to a checksum of at least the request identifier and at least a portion of the custom attribute;

if the web page element comprises the custom attribute and if the verification value matches the expected verification value, send the web page comprising the web page element to the client; and if the web page element does not comprise the custom attribute or if the verification value does not match the expected verification value, perform a protective operation regarding the web page element.

14. The system as recited in claim 13, wherein the program instructions are further executable by the at least one processor to:

generate the expected verification value based on injectable content of the web page element.

15. The system as recited in claim 13, wherein, in performing the protective operation regarding the web page element, the program instructions are further executable by the at least one processor to:

generate a modified web page in which an effect of the web page element is negated.

16. The system as recited in claim 13, wherein, in performing the protective operation regarding the web page element, the program instructions are further executable by the at least one processor to:

send a redirect link to the client instead of the web page.

17. The system as recited in claim 13, wherein the program instructions are further executable by the at least one processor to:

skip determining whether a different web page element comprises a corresponding custom attribute, wherein the web page comprises the different web page element, and wherein the different web page element is identified by a whitelist.

18. A non-transitory computer-readable storage medium storing program instructions that, when executed on one or more computers, cause the one or more computers to perform:

receiving a request for a web page from a client, wherein the web page comprises a web page element;

generate a request identifier for the requested web page according to a technique to obscure prediction of the request identifier by an outside entity;

determining if the web page comprises a data integrity token for the web page element;

determining if a value for the data integrity token matches an expected value, wherein the expected value is calculated, for the web page element, according to a checksum of at least the request identifier and at least a portion of the web page element;

if the web page comprises the data integrity token and if the value matches the expected value, sending the web page comprising the web page element to the client; and if the web page does not comprise the data integrity token or if the value does not match the expected value, rejecting the web page element.

19. The non-transitory computer-readable storage medium as recited in claim 18, wherein rejecting the web page element comprises replacing executable content of the web page element with a comment.

20. The non-transitory computer-readable storage medium as recited in claim 18, wherein the program instructions, when executed on the one or more computers, further cause the one or more computers to perform:

blocking access to the web page in response to rejecting the web page element.

21. The non-transitory computer-readable storage medium as recited in claim 18, wherein the program instructions, when executed on the one or more computers, further cause the one or more computers to perform:

generating the expected value based on content of the web page element.

22. The non-transitory computer-readable storage medium as recited in claim 18, wherein the web page element comprises a tag.

23. The non-transitory computer-readable storage medium as recited in claim 18, wherein the web page element comprises an event attribute.

24. The non-transitory computer-readable storage medium as recited in claim 18, wherein the program instructions, when executed on the one or more computers, further cause the one or more computers to perform:

adding the data integrity token to the web page prior to receiving the request for the web page from the client; and generating the value for the data integrity token after receiving the request for the web page from the client.

25. The non-transitory computer-readable storage medium as recited in claim 18, wherein the program instructions, when executed on the one or more computers, further cause the one or more computers to perform:

skip determining whether a different web page element comprises a corresponding data integrity token, wherein the web page comprises the different web page element, and wherein the different web page element is identified by a whitelist as an unprotected web page element.

\* \* \* \* \*